UNITED STATES PATENT OFFICE.

BENJAMIN R. SMITH AND JOHN C. HARRIS, OF PHILADELPHIA, PA.

IMPROVEMENT IN PLASTER FOR WALLS.

Specification forming part of Letters Patent No. 111,267, dated January 24, 1871; reissue No. 5,389, dated April 29, 1873; application filed March 18, 1873.

*To all whom it may concern:*

Be it known that we, BENJAMIN R. SMITH and JOHN CAMPBELL HARRIS, both of Philadelphia, in the State of Pennsylvania, have invented certain Improvements in the Manufacture of Plaster for the Walls and Ceilings of Buildings, and for other purposes, of which the following is a specification:

*Nature and Objects of the Invention.*

Our invention consists in the preparation of a new material for coating walls and ceilings, and for other analogous purposes, the said material being adapted for immediate use, when mixed with water, without the necessity of mixing any other substance with it. Our invention further consists in providing material by means of which walls can be finished in colors, the tint extending uniformly through the final coat of plaster, and avoiding all necessity for subsequent color-washing.

*General Description.*

Our improved compound is prepared by mixing dried and powdered hydrate of lime with crude ground plaster or gypsum, and calcining the mixture, or in mixing the dry hydrate of lime with plaster which has been already calcined. The compound, prepared in either manner, may be colored in any stage of the process by the addition of such pigments or dyes as may be found best adapted for the purpose. In the preparation of colored plaster it is of very great importance to have the coloring matter mingled with perfect uniformity throughout the entire mass. We therefore prefer to proceed substantially as follows: We first slack the lime, and then, while it is still in pulp, thoroughly mix in the required pigment. The mixture of lime and coloring matter is then ground, then dried, and subsequently ground again. It is then mixed with calcined gypsum in proper proportions, and the mixture is finally ground to thoroughly mingle the ingredients in a homogeneous mass. Sand may also be mixed with the compound when such a finish as is given by sand is wanted, or other material to improve the working.

Our compound can be used, either white or tinted, for all purposes for which calcined plaster is employed, and it possesses all the good qualities of the material in customary use for hard-finishing walls and ceilings.

When ordinary calcined plaster is used on walls, ceilings, cornices, &c., it is necessary to mix it before using with what is called "white-stuff," which is made by the plasterer, and the preparation of which is tedious and unsatisfactory. The process requires several days for its perfection, and as it is usually conducted in the public streets, it interferes much with the proper use of the same. The dirt and dust, which is so constantly flying, gets into this white-stuff to such an extent that, when the plaster is mixed with it, it is impossible to get a pure white finish. With our compound no such risk is run, as it is always ready for mixing with water and using, and the plasterer thereby saves the labor, time, and expense of making and manipulating the white-stuff, and gets a white wall, instead of one clouded with dirt, for his pains.

Our composition is taken to the room to be plastered in a dry state, in any necessary quantities, and as it is required for use it is mixed with water and immediately worked into the wall. A whiter and better wall is thus produced at a lower cost than by the usual process, or, if a colored or tinted wall be desired, this is produced by our process in the most satisfactory manner without any extra labor, calsomining, color-washing, painting, or any other subsequent process for coloring the surface being thus superseded, and the coloring is by our process rendered much more permanent, because it extends throughout the body of the final coat of plaster.

*Claims.*

The following is claimed as new:

1. The compound plaster produced of the materials and in the manner substantially as above set forth.
2. A homogenuous tinted plaster, adapted for coating walls or ceilings, substantially as described.
3. The process hereinbefore described of mixing lime, gypsum, and coloring-matter, to produce a tinted plaster.

BENJAMIN R. SMITH.
JOHN CAMPBELL HARRIS.

Witnesses:
WM. H. SUYDAM,
P. WHITECHURCH.